(12) United States Patent
Kelley et al.

(10) Patent No.: US 10,401,199 B2
(45) Date of Patent: Sep. 3, 2019

(54) TRACKING USING DISTRIBUTED FIBRE OPTIC SENSING

(71) Applicant: OPTASENSE HOLDINGS LIMITED, Farnborough, Hampshire (GB)

(72) Inventors: John Kelley, Farnborough (GB); Andrew Lewis, Farnborough (GB)

(73) Assignee: Optasense Holdings Limited (GB)

( * ) Notice: Subject to any disclaimer, the term of this patent is extended or adjusted under 35 U.S.C. 154(b) by 0 days.

(21) Appl. No.: 15/778,525

(22) PCT Filed: Nov. 25, 2016

(86) PCT No.: PCT/GB2016/053720
§ 371 (c)(1),
(2) Date: May 23, 2018

(87) PCT Pub. No.: WO2017/093715
PCT Pub. Date: Jun. 8, 2017

(65) Prior Publication Data
US 2018/0340801 A1 Nov. 29, 2018

(30) Foreign Application Priority Data

Nov. 30, 2015 (GB) .................................. 1521116.2

(51) Int. Cl.
*G01H 9/00* (2006.01)
*B61L 23/04* (2006.01)
(Continued)

(52) U.S. Cl.
CPC ........ *G01D 5/35358* (2013.01); *B61L 23/041* (2013.01); *B61L 23/30* (2013.01);
(Continued)

(58) Field of Classification Search
CPC ........ G01H 9/004; G01H 9/006; G01D 5/353; G01D 5/35338; G01D 5/35341;
(Continued)

(56) References Cited

U.S. PATENT DOCUMENTS

| 5,696,503 A | 12/1997 | Nansburg |
| 7,555,383 B2 * | 6/2009 | Siegel ...................... G01S 13/66 342/357.59 |

(Continued)

FOREIGN PATENT DOCUMENTS

| CN | 101 540 104 | 9/2009 |
| GB | 2442745 | 4/2008 |

(Continued)

*Primary Examiner* — Gordon J Stock, Jr.
(74) *Attorney, Agent, or Firm* — McDonnell Boehnen Hulbert & Berghoff LLP (57) ABSTRACT

This application describes methods and apparatus for tracking targets in a fiber optic distributed acoustic sensing (DAS) network. The DAS network comprises a plurality of interrogator units interrogating sensing fibers deployed along paths of interest to provide DAS sensors. Targets are tracked at each of a plurality of tracker nodes of the DAS network, where each tracker node receives measurement signals from one or more DAS sensors and applies a tracking algorithm to track any targets in a respective tracker zone. Each tracker node maintains, for each target, a tracking dataset of target properties for tracking that target. The method involves identifying when a first target in a first tracker zone of a first tracker node is approaching a second tracker zone of a second tracker nod and supplying for the first tracker node to the second tracker node a Target Descriptor for the first target.

20 Claims, 2 Drawing Sheets

(51) Int. Cl.
  B61L 23/30 (2006.01)
  B61L 25/02 (2006.01)
  B61L 27/00 (2006.01)
  G01D 5/353 (2006.01)
(52) U.S. Cl.
  CPC ........... B61L 25/021 (2013.01); B61L 25/025 (2013.01); B61L 27/0077 (2013.01); G01D 5/353 (2013.01); G01H 9/004 (2013.01); *G01D 5/35361* (2013.01); *G01D 5/35364* (2013.01)
(58) Field of Classification Search
  CPC ........... G01D 5/35345; G01D 5/35348; G01D 5/35351; G01D 5/35354; G01D 5/35358; G01D 5/35361; G01D 5/35364; G01D 5/35367; G01D 5/3537; G01D 5/35374; G01D 5/35377; G01D 5/35383; B61L 23/04; B61L 23/041; B61L 23/042; B61L 23/044; B61L 23/045; B61L 23/047; B61L 23/048; B61L 23/30; B61L 27/0005; B61L 27/0077

USPC ...................................... 356/73.1; 385/12, 13
See application file for complete search history.

(56) References Cited

U.S. PATENT DOCUMENTS

| | | | |
|---|---|---|---|
| 7,940,177 B2* | 5/2011 | Krill | G08B 29/188 340/539.22 |
| 8,237,101 B2* | 8/2012 | Gunning, III | F41G 3/225 250/203.2 |
| 9,733,351 B2* | 8/2017 | Kozma | G01S 7/003 |

FOREIGN PATENT DOCUMENTS

| WO | WO 2011/025563 | 3/2011 |
|---|---|---|
| WO | WO 2011/027166 | 3/2011 |
| WO | WO 2012/137021 | 10/2012 |
| WO | WO 2012/137022 | 10/2012 |

* cited by examiner

TRACKING USING DISTRIBUTED FIBRE OPTIC SENSING

FIELD OF THE INVENTION

This application relates to methods and apparatus for tracking objects using distributed fibre optic sensors and in particular to tracking of targets by multiple fibre optic distributed acoustic sensors.

BACKGROUND OF THE INVENTION

Fibre optic distributed acoustic sensing (DAS) is a known type of sensing where an optical fibre is deployed as a sensing fibre and repeatedly interrogated with electromagnetic radiation to provide sensing of acoustic activity along its length. Typically one or more input pulses of radiation are launched into the optical fibre. By analysing the radiation backscattered from within the fibre, the fibre can effectively be divided into a plurality of discrete sensing portions which may be (but do not have to be) contiguous. Within each discrete sensing portion mechanical disturbances of the fibre, for instance, strains due to incident acoustic waves, cause a variation in the properties of the radiation which is backscattered from that portion. This variation can be detected and analysed and used to give a measure of the disturbance of the fibre at that sensing portion. Thus the DAS sensor effectively acts as a linear sensing array of acoustic sensing portions of optical fibre. The length of the sensing portions of fibre are determined by the characteristics of the interrogating radiation and the processing applied to the backscatter signals but typically sensing portions of the order of a few meters to a few tens of meters or so may be used.

DAS has been used in a number of applications such as perimeter security and monitoring of linear assets such as pipelines. One particular application where it has been proposed that DAS sensors may be employed is in monitoring movement of traffic on a transport network, for example monitoring trains moving on a rail network.

For traffic monitoring sensing fibres can be deployed to run generally along the path of at least parts of a transport network, for instance with sensing fibre(s) being deployed to run generally along the path of one or more rail tracks or a rail network or of a road network. Movement of a vehicle on the transport network, e.g. a train on a train track, adjacent a DAS sensing fibre will generate acoustic signals that can be used to track the vehicle as it moves, providing real time positional information to a resolution of a few tens of meters continuously along the entire length of the monitored section. DAS has several advantages for such traffic monitoring. DAS can be applied to provide many sensing channels over a long length of fibre, for example DAS can be applied on fibre lengths of up to 40 km or more with contiguous sensing channels of the order of 10 m long. Thus a long stretch of the transport network can be monitored using a single DAS sensor. For lengths of more that 40 km or so several DAS sensors units can be deployed at various intervals to provide continuous monitoring of any desired length of the transport network.

The sensing fibre may be standard telecoms fibre and thus is relatively cheap. The fibre may be simply buried alongside the transport networks, e.g. along the sides or underneath tracks or roads in a narrow channel and is relatively easy to install. The optical fibre can be encased in a protective casing and can survive for a long time with no maintenance. Thus installation and maintenance costs are low. In many transport networks there may already be optic fibre deployed along at least the major routes and such existing communications infrastructure may comprise redundant optical fibres that can be used for DAS.

The optical fibre is interrogated by optical pulses generated by the interrogator unit and thus power is only needed for the interrogator units.

In a transport network setting a DAS system thus provides the ability to achieve both a desired spatial resolution and scope of coverage that would be very difficult and costly to achieve using other sensing technologies and which allows for real-time monitoring and/or control of the transport network.

As mentioned above to provide coverage over a large area of interest, such as with a typical transport network, it may be necessary to have a plurality of sensing fibres covering different parts of the area of interest, each sensing fibre being interrogated by a suitable DAS interrogator unit. This may thus involve a plurality of DAS interrogator units being deployed in the area to be monitored, at least some of which may be remote from one another.

SUMMARY OF THE INVENTION

Embodiments of the present invention relate to methods and apparatus for providing target tacking in a DAS sensor network with a plurality of DAS interrogator units.

Thus according to the present invention there is provided a method of tracking targets in a fibre optic distributed acoustic sensing (DAS) network comprising:
  tracking targets at each of a plurality of tracker nodes of the DAS network, wherein each tracker node:
  receives measurement signals from one or more DAS sensors;
  applies a tracking algorithm to said measurement signals to track any targets in a tracker zone corresponding to an area monitored by said one or more DAS sensors; and
  maintains, for each target, a tracking dataset of target properties for tracking that target;
the method further comprising:
  identifying when a first target in a first tracker zone of a first tracker node is approaching a second tracker zone of a second tracker node and supplying from the first tracker node to the second tracker node a Target Descriptor for the first target wherein the Target Descriptor comprises at least some of the tracking dataset for the first target; and
  using the Target Descriptor at the second tracker node to track any entry of the first target into the second tracker zone.

The method thus hands over from the first tracker node to the second tracker node data regarding the target being tracked. In use, as will be described in more detail below, a tracking algorithm will maintain a tracking dataset pertaining to the target for the purposes of tracking. This tracking dataset may be based on historic data from tracking the target. In this embodiment the first tracker node provides at least some of the tracking dataset as part of a Target Descriptor to aid acquisition of the target by the second tracker node. This avoids the second tracker node having to acquire and track target completely afresh as if it were a completely new target. In effect targets are handed over between the tracker nodes.

The Target Descriptor may also comprise an identification for the first target which is unique across the DAS network.

In some embodiments the tracking dataset comprises at least one of: current position, velocity, acceleration and rate of change of acceleration. In some embodiments the tracking data set may comprise a state vector and covariance matrix for a Kalman filter.

In some embodiment the Target Descriptor for the first target may comprise all of the tracking dataset maintained by the first tracker node for the first target.

The Target Descriptor for the first target may further comprise a time stamp indicating the last time that the tracking dataset was updated or validated.

The step of identifying when a first target in a first tracker zone of a first tracker node is approaching a second tracker zone of a second tracker node may be performed by the first tracker node. In such a case each tracker node may be aware of at least its neighbouring tracker nodes with tracker zones that border or overlap with its tracker zone.

In some instances however the step of identifying when a first target in a first tracker zone of a first tracker node is approaching a second tracker zone of a second tracker node may be performed by a control network node that receives information about targets being tracked by each of the tracker nodes. The control node may identify when a first target in a first tracker zone of a first tracker node is approaching a second tracker zone of a second tracker node and may then generate a control signal to the first tracker node instructing it to transmit the relevant Target Descriptor. The control signal may instruct the first tracker node to send the relevant Target Descriptor to the second tracker node. Alternatively the control node may receive the relevant Target Descriptor and forward it to the second tracker node.

The Target Descriptor may comprise a first field which indicates which tracker node is responsible for the first target. The first tracker node may in some embodiments provide at least one Target Descriptor to the second tracker node with the first field set to indicate that the first tracker node is responsible for the first target and subsequently provide an updated Target Descriptor to the second tracker node with the first field set to indicate that the first tracker node is no longer responsible for the first target.

In some embodiments each tracker node may be configured to, for at least some targets being tracked, maintain at least one matched filter template for the target and to track the relevant target using the at least one matched filter. In which case the Target Descriptor may comprise at least one matched filter template maintained by the first tracker node for the first target. The second tracker node may use the at least one matched filter template from the Target Descriptor to acquire and track the first target in the second tracker zone.

The DAS network may be configured to track movement of traffic on a transport network. The transport network may be a rail network.

In another aspect there is provided a tracker node for a fibre optic distributed acoustic sensing (DAS) network comprising:
a processor configured to, in use:
  receive measurement signals from one or more DAS sensors; and
  apply a tracking algorithm to said measurement signals to track any targets in a first tracker zone corresponding to an area monitored by said one or more DAS sensors;
  wherein the tracking algorithm is configured to maintain, for any such target, a tracking dataset of target properties for tracking that target;
  wherein the processor is configured such that, when a first target approaches a second tracker zone of another tracker node of the DAS network, the processor transmits a Target Descriptor for that first target to the appropriate tracker node for said second tracker zone, wherein said Target Descriptor comprises at least part of said tracking dataset.

The tracker node of this aspect may be arranged to implemented the method of any of the variants of the first aspect.

The processor may further be configured to: receive a Target Descriptor for a second target, wherein Target Descriptor for the second target corresponds to data about a target in a tracker zone of another tracker node of the DAS sensor network that is approaching the first tracker zone. The processor may be configured to use said Target Descriptor to track any entry of the second target into the first tracker zone.

In another aspect there is provided a tracker node tracker node for a fibre optic distributed acoustic sensing (DAS) sensor network comprising:
a processor configured to, in use:
  receive measurement signals from one or more DAS sensors; and
  apply a tracking algorithm to said measurement signals to track any targets in a first tracker zone corresponding to an area monitored by said one or more DAS sensors;
  wherein the tracking algorithm is configured to maintain, for any such target, a tracking dataset of target properties for tracking that target;
  wherein the processor is configured to receive a Target Descriptor for a first target, wherein Target Descriptor for the first target corresponds to data about a target in a second tracker zone of another tracker node of the DAS sensor network that is approaching the first tracker zone, and
  the processor is configured to use said Target Descriptor to track any entry of the first target into the first tracker zone.

The tracker node of this aspect may also be arranged to implemented the method of any of the variants of the first aspect.

Also provided is a control node for a fibre optic distributed acoustic sensing (DAS) sensor network comprising:
  a controller configured to receive target parameters from a plurality of tracker nodes, each tracker node comprising one or more DAS sensors and a processor configured to apply a tracking algorithm to track any targets in a first tracker zone corresponding to an area monitored by said one or more DAS sensors;
  wherein the controller is configured to determine when a first target in a first tracker zone is approaching a second tracker zone and to control transfer of a Target Descriptor from the tracker node associated with the first tracker zone to the tracker node associated with the second tracker zone, wherein the Target Descriptor comprises at least part of a tracking dataset of target properties for tracking the first target.

DESCRIPTION OF THE DRAWINGS

The invention will now be described by way of example only with respect to the accompanying figures, of which.

DESCRIPTION OF THE INVENTION

Figure 1:
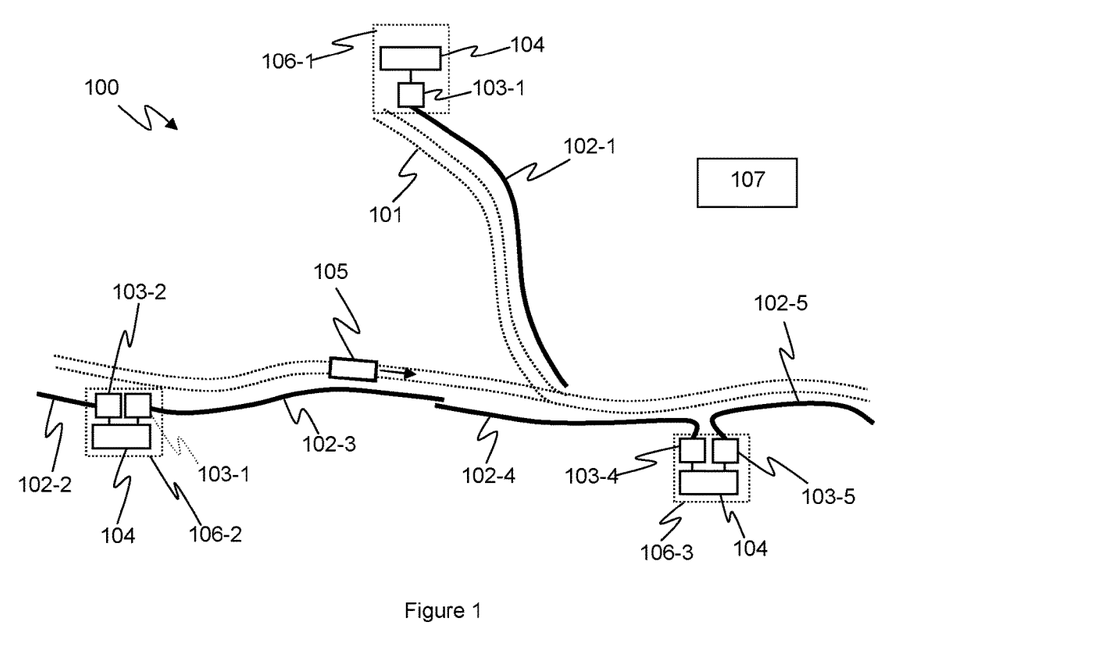
FIG. 1 illustrates one example of a DAS sensor network.

FIG. 1 illustrates one example of a fibre optic distributed acoustic sensing (DAS) network 100. The DAS network 100 is arranged to provide monitoring of an area of interest and in this example the network is arranged to provide monitoring of a rail transport network comprising one or more railways or rail tracks 101. The DAS network 100 comprises a plurality of optical fibres 102-1 to 102-5 each deployed along a path of interest. In this example each of the optical fibres 102-1 to 102-5, which will be referred to herein as sensing fibres, is deployed such that at least part of the sensing fibre runs generally along the path of part of the rail tracks 101. Each sensing fibre 102-1- to 102-5 is attached to a respective DAS interrogator unit 103-1 to 103-5. In use the DAS interrogator unit may perform distributed acoustic sensing on the sensing optical fibre. The combination of a DAS interrogator unit 103 and sensing fibre 102 shall be referred to herein as a DAS sensor.

Figure 2:
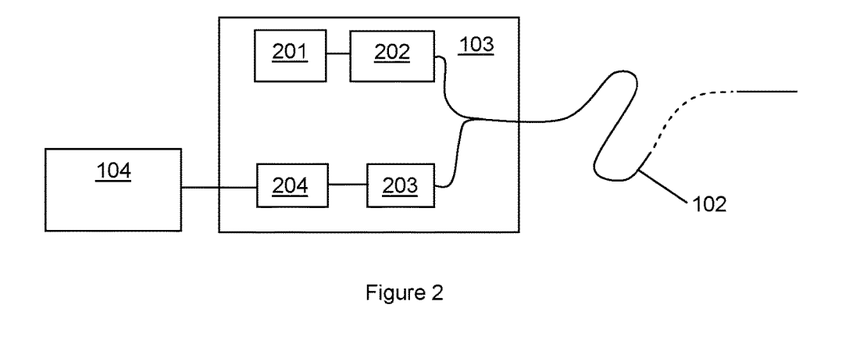
FIG. 2 illustrates a DAS interrogator unit.

FIG. 2 illustrates one example of DAS interrogator unit 103. As discussed the sensing fibre 102 is optically coupled at one end to the interrogator unit 103, either directly through some suitable removable connection or in some instances indirectly, e.g. via an intermediate fibre or the like. As mentioned the sensing fibre 102 can be many kilometers in length and can be, for instance 40 km or more in length. The sensing fibre may be a standard, unmodified single mode optical fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the sensing fibre may comprise an optical fibre which has been fabricated or arranged to be especially sensitive to incident vibrations. Typically the sensing optical fibre will form part of a fibre optic cable structure, possibly as one of a bundle of optical fibres within the cable and optionally with other components such as strengthening or armouring elements or elements arranged to tailor the response to transverse strains. As the sensing fibre is typically relatively inexpensive the sensing fibre may be deployed in a location in a relatively permanent fashion as the costs of leaving the fibre in situ are not significant. For example at least parts of the sensing fibre may be buried in the ground alongside the rail track.

In operation the interrogator unit 103 launches coherent interrogating electromagnetic radiation, which may for example comprise a series of optical pulses having a selected frequency pattern, into the sensing fibre. The optical pulses may have a frequency pattern as described in patent publications GB2,442,745 or WO2012/137022, the contents of which are hereby incorporated by reference thereto, although DAS sensors using a single interrogating pulse or a continuously modulated wave are also known and may be used. Note that as used herein the term "optical" is not restricted to the visible spectrum and optical radiation includes infrared radiation and ultraviolet radiation. The interrogator unit 103 therefore comprises at least one laser 201 and at least one optical modulator 202 for producing the interrogating radiation, which in one embodiment may comprise a plurality of optical pulses separated by a known optical frequency difference.

As described in GB2,442,745 or WO2012/137022 the phenomenon of Rayleigh backscattering results in some fraction of the light input into the fibre being scattered back to the interrogator unit, where it is detected and processed to provide a measurement signal which is representative of disturbances acting on the fibre. As the interrogating radiation is coherent the Rayleigh backscatter received back at the interrogator at any instant is an interference signal of the backscatter generated within the fibre from a particular position in the fibre. It will be noted this Rayleigh backscatter is generated by interaction between the interrogating radiation and inherent scattering sites present within the optical fibre. Thus the sensing function may be effectively distributed throughout the whole sensing fibre (although the returns are processed in time bins to provide results from individual sensing portions of the fibre). Such a sensor is therefore referred to as a distributed sensor or intrinsic sensor as the sensing is distributed throughout and intrinsic to the fibre itself. This is in contrast to sensors that used fibres having fibre Bragg gratings (FBGs) or similar deliberately introduced extrinsic reflection sites where the sensing function is provided in defined areas, typically as a point sensor.

The distribution of scattering sites throughout the sensing fibre is effectively random and thus the backscatter interference signal includes a component that varies randomly along the length of the sensing fibre. However in general, in the absence of any environmental stimulus acting on the sensing fibre the characteristics of the backscatter from a given sensing portion of the fibre will be the same for successive interrogations (assuming the characteristics of the interrogating radiation do not change). However an environmental stimulus such as an incident acoustic wave that creates a dynamic strain on a section of fibre will result in a change in the effective optical path length for that sensing portion with a resultant variation in the properties of the backscatter interference signal from that section. This variation can be detected and used to indicate the extent of disturbances acting on the sensing fibre.

The interrogator unit 103 thus also comprises at least one photodetector 203 arranged to detect radiation which is Rayleigh backscattered from the intrinsic scattering sites within the fibre 102. It should be noted however that whilst a Rayleigh backscatter DAS sensor is very useful in embodiments of the present invention, systems based on Brillouin or Raman scattering are also known and could be used in some embodiments of the invention.

The signal from the photodetector is processed by signal processor 204 in time bins corresponding to the round trip travel time to defined sensing portions of the sensing fibre. The signals in each time bin are processed to detect any variation in the backscatter properties and generate a measurement signal for each sensing portion.

In some examples the signal processor demodulates the returned signal based on the frequency difference between the optical pulses of interrogating radiation launched into the sensing fibre. The interrogator may operate as described in GB2,442,745 or WO2012/137022 for example or as described in WO2012/137021. In some embodiments the signal processor may also apply a phase unwrap algorithm.

In some examples the phase of a measurement signal is derived from the backscattered light from various sections of the optical fibre. Any changes in the effective optical path length within a given section of fibre, such as would be due to incident pressure waves causing strain on the fibre will lead to a change in the measured phase between repeated interrogations. Thus dynamic changes acting on the fibre can therefore be detected in each of a plurality of sensing portions of the optical fibre.

The form of the optical input and the method of detection allow a single continuous optical fibre to be spatially resolved into discrete longitudinal sensing portions. That is, the acoustic signal sensed at one sensing portion can be provided substantially independently of the sensed signal at an adjacent portion. The spatial resolution of the sensing portions of optical fibre may, for example, be approximately 10 m, which for a continuous length of fibre of the order of 40 km say provides 4000 independent acoustic channels or so deployed along the 40 km of fibre. More channels could be arranged on a fibre with a different channel width.

Note that term "acoustic" shall mean any type of pressure wave or mechanical disturbance that may result in a change of strain on an optical fibre and for the avoidance of doubt the term acoustic be taken to include ultrasonic and subsonic waves as well as seismic waves. As used in this specification the term "distributed acoustic sensing" or "DAS" will be taken to mean sensing by optically interrogating an optical fibre to provide a plurality of discrete acoustic sensing portions distributed longitudinally along the fibre and the term "distributed acoustic sensor" shall be interpreted accordingly.

The output from the interrogator unit 103 may thus be a measurement signal for each sensing portion of the relevant sensing fibre which is indicative of the acoustic signals or dynamic strains acting on that sensing portion. The individual sensing portions may also be referred to as channels of the DAS sensor. The output of the interrogator unit 103 may be passed to a processor unit 104 which may be configured to analyse the measurement signals for the various channels to look for signals characteristic of an event of interest.

In the example illustrated in FIG. 1 a processing unit 104 may be arranged to process the measurement signals from one or more DAS interrogator units 103, i.e. from one or more DAS sensors, in order to detect one or more events of interest on the rail network. In particular the processing unit(s) may be configured to detect measurement signals characteristic of movement of a train 105 on a section of the railway 101. The processing unit(s) 104 may also be configured to track movement of the train on the network. A processing unit may therefore be arranged to implement a tracker, i.e. to apply a tracking algorithm to the measurement signals from the DAS sensor(s), to track movement of a target—in this example a train on the rail network. The tracker thus operates using the DAS measurement data available to that processing unit.

A processor unit 104 may be co-located with an interrogator unit 103 or remote therefrom. However in practice each interrogator unit will, in use, output a relatively significant amount of data. To avoid the burden of having to transmit large amounts of data around the DAS network or to some control node 107, processor units 104 may typically tend to be co-located with one or more interrogator units to provide local processing of the measurement signals.

The processing units 104 may therefore be seen as tracker nodes of the DAS network.

Referring to FIG. 1 the DAS network may therefore comprise a plurality of distributed tracker nodes 106-1 to 106-3, possibly also with at least one control node 107. In some tracker nodes, e.g. tracker node 106-1, a processing unit 104 may receive data just from a single interrogator unit 103-1. In some tracker nodes however a processor unit 104 may be co-located with two or more interrogator units, as illustrated by tracker nodes 106-2 and 106-3. The DAS data available to a processing unit 104 at a tracker node may therefore comprise measurement signals from one or more DAS interrogator units 103, i.e. from one or more DAS sensors.

In general the tracker will be implemented to operate on a substantially contiguous set of DAS channels which are spatially calibrated, i.e. the spatial arrangement of the DAS channels with respect to one another is known. Thus the tracker implemented at tracker node 106-1 operates to track a target across the channels of sensing fibre 102-1. The tracker implemented at tracker node 106-2 operates to track a target across the channels of sensing fibres 102-2 and 102-3 which, in this example form a substantially continuous back-to-back set of DAS channels.

Each tracker may identify and track targets moving on its monitored section of the network, i.e. a tracker zone corresponding to an area monitored by the one or more DAS sensors that supply data to a given tracker node 106. Information regarding the tracked target may be provided to a control node 107, e.g. a traffic network control centre, thus avoiding the need to transmit the base acoustic measurement data, i.e. the underlying data generated by the DAS interrogator unit(s).

Each tracker node may typically be implemented to maintain, for each identified target, a tracking dataset of target properties for tracking that target. The exact form of tracking dataset will vary depending on the implementation of the specific tracker but for example a tracker may maintain a dataset for each target with values for one or more of: current position, velocity, acceleration and rate of change of acceleration. In some embodiments a more sophisticated tracking method may be employed, for example using a Kalman filter. In this case the internal state of the filter represented by the state vector and covariance matrix may form at least part of the pertinent dataset.

Regardless the sophistication of the tracker, it may be implemented to operate on one-dimensional data in the case of constrained target such as a train on a railway track. For monitoring a railway where a sensing fibre is deployed to run generally along the path of the rail track the DAS channels may be largely mapped to progression along the track and the tracker may be constrained to track targets moving along the channels.

In some applications however the tracker may operate on two-dimensional data, e.g. for tracking a surface target such as a pedestrian or surface vehicle that is less constrained. In some applications it might be appropriate for such a tracker to operate on three-dimensional data. For example DAS has been proposed for determining the location in three dimensions of a drill head being used to drill a wellbore and a tracker may be implemented to track drilling progress. In such an example data from more than DAS sensing fibre may be required to provide an estimate of three dimensional position.

Referring to FIG. 1 a tracker implemented by the processing unit of tracker node 106-2 may therefore track the movement of train 105 along the rail track. It will be seen however that at some point the train will leave the section of the rail network monitored by sensing fibre 102-3 and progress to a section of the rail track that is monitored by sensing fibre 102-4 that is interrogated by interrogator unit 103-4 which is associated with a different processing unit. It will therefore be appreciated that signals corresponding to this target, i.e. the train, will disappear from the data available to the tracker at tracker node 106-2 and instead start to appear in the data available to a separate tracker implemented at tracker node 106-3. In other words the target will cross from the tracker zone of tracker node 106-2 into the tracker zone of tracker node 106-3.

Embodiments of the present invention relate to methods and apparatus for target handover between separate trackers of a DAS sensor network. Embodiments thus relate to identifying when a first target in a first tracker zone of a first tracker node is approaching a second tracker zone of a second tracker node and supplying from the first tracker node to the second tracker node data which will improve the acquisition and tracking of the target by the second tracker node.

The performance of a tracker, in terms the accuracy of the current position and/or velocity of a target and/or the accuracy of a velocity/location prediction is generally best when an identified target has been tracked for some time, i.e. only after historic data corresponding to a certain period following target acquisition is/has been available to the tracker. According to methods of the present disclosure data regarding a target is passed from a first tracker node to a second tracker node to mitigate any drop in performance associated with the second tracker node having to acquire and track the target completely on its own without the benefit of any historic data, i.e. as if it were a totally new target. By providing at least some information regarding the target from one tracker node to another, e.g. from one processing unit to another processing unit, of a DAS network, the tracking performance across the whole network may be improved.

In a method according to one embodiment the data that is passed from one tracker node to another tracker node comprises a Target Descriptor for the relevant target. The Target Descriptor may comprise at least some, and possibly all, of the dataset that the tracker maintains for each target as discussed above, for example, current position, velocity, acceleration and/or rate of change of acceleration. The Target Descriptor also comprises a unique identification for each target, e.g. a unique target number or code which is unique across the DAS network. The identification could be procedurally generated, e.g. based on the time and location of first detection of a new target, so as to ensure that each tracker node can generate a unique ID when required or the next identification from a predefined list may be allocated by the processing unit of a tracker node or received from a control node.

In some embodiments the Target Descriptor may also comprise a timestamp for the tracker dataset, i.e. an indication of the time at which the dataset was last updated/validated. This may allow track predictions to be made with a real-time reference.

When a target moves out of the tracker zone of a tracker node, i.e. the areas being monitored by a tracker (an 'incumbent tracker'), the relevant Target Descriptor for that target may be passed to at least one tracker node associated with a likely destination tracker zone (i.e. a likely 'successor tracker'). Thus, in the example illustrated in FIG. 1, as the train 105 moves from the section of track monitored by sensing fibre 102-3 to the section of track monitored by sensing fibre 102-4, the incumbent tracker running on the processing unit 104 at tracker node 106-2 will hand the relevant Target Descriptor to a successor tracker running on the processing unit 104 of tracker node 106-3. The Target Descriptor may be communicated to the successor tracker shortly before the target moves between the two datastreams. The optimal timing of this event may depend on application details but typically the Target Descriptor should be passed just before the signal from the target starts to appear in the data-stream of the successor tracker.

In some cases the method may additionally comprise subsequently passing at least one updated Target Descriptor which will carry more recent data. In this way the successor tracker receives early warning of the target as it is about to appear but also receives the most up to date dataset details as the target transitions between the source and destination tracker zones. As mentioned above each Target Descriptor carries a unique ID for the target so that this process could be repeated multiple times without ambiguity if the application demands.

Conveniently the incumbent tracker provides the Target Descriptor to only those tracker nodes with corresponding tracker zones that are likely destinations for the relevant target. In other words as the train passes from the section of track alongside sensing fibre 102-3 to the section of track alongside sensing fibre 102-4 the relevant Target Descriptor is passed to the processing unit 104 of tracker node 106-3 but not to tracker node 106-1. In some embodiments at least the local network topology may be known by the individual tracker nodes, i.e. a first tracker node may be aware of its neighbouring tracker nodes with tracker zones that border or overlap with the tracker zone of the first tracker node. In some embodiments however an individual tracker node may communicate with a control node 107 and it may be the control node 107 that identifies when a first target in a first tracker zone of a first tracker node is approaching a second tracker zone of a second tracker node. In this case the control node 107 may take steps to ensure the relevant Target Descriptor is communicated from the first tracker node to the second tracker node. In some embodiments the control node may send a control signal to the first tracker node instructing it to send the relevant Target Descriptor to the second tracker node. Alternatively the control node may receive the Target Descriptor from the first tracker node and forward it to the second tracker node.

For a rail network this would be relatively simple. For example in the example shown a train 105 travelling as shown will inevitably pass from the section of track monitored by sensing fibre 102-3 to that monitored by sensing fibre 102-4. Thus a train travelling in this direction can only pass from the tracker zone of tracker node 106-2 to the tracker zone of tracker node 106-3. If the train then continues to travel in the same general direction it will, in due course, pass into the section of track monitored by sensing fibre 102-5 but remain in the tracker zone of tracker node 106-3. It will be noted however that in this example it may instead be possible for the train to take a different branch, i.e. that monitored by sensing fibre 102-1 and thus associated with the tracker zone of tracker node 106-1. As the train approaches this branch of the network the Target Descriptor may also be provided to the candidate successor tracker associated with tracker node 106-1 in case the train takes the branch. The arrangement of the various tracker zones is thus relatively well defined and simple.

In rail network monitoring the intended path of a given train through the network and/or the expected motion of the train given the present state of control signals for the network may also be known. In other words it may be expected that a tracked train goes a certain way at a possible branch point.

For other applications, e.g. a large-scale border protection system, which may be required to track movement of personnel and/or vehicles that are free to move in a less constrained way and/or where there may be multiple different sensing fibres that provide at least partly overlapping tracker zones, determining the likely candidate successor tracker may be more complex and the Target Descriptor may be provided to several candidate successor trackers, i.e. the tracker nodes of several possible destination tracker zones, based on the best estimate of target position and trajectory.

In some embodiments an incumbent tracker may include a field, e.g. a flag, in the Target Descriptor which indicates that it is currently the responsible tracker for a particular target. In this case a successor tracker may use the target dataset to aid in acquisition of the target but it may not start to report target parameters, e.g. to a central control 207. In this way the successor tracker does not provide target report whilst the target is still being tracked by the incumbent tracker, which itself will be providing target reports. When the incumbent tracker loses the target or loses sufficient confidence in tracking of the target an updated Target Descriptor may be provided to the successor tracker with the relevant flag reset so that the successor tracker can then become the new incumbent tracker and start to report target parameters. Additionally or alternatively the successor tracker may be arranged to use the Target Descriptor to aid in acquisition of the target. If the successor tracker acquires the target with good confidence then it may signal to the incumbent tracker that the target has been acquired and at that point the successor tracker may become the new incumbent tracker and take over responsibility for reporting.

In some embodiments however multiple trackers may be arranged to each track and report the same target. Thus both an incumbent tracker and a successor tracker may provide target reports as long as they can both track the target. Provided that the unique ID for the target, which will be shared be the trackers, is included in the report then there will be no ambiguity in reporting and the multiple report may be useful for some control node for confidence or redundancy purposes.

According to methods according to the present disclosure, a target may thus be tracked continuously across an arbitrary network that has essentially contiguous DAS coverage without the target having to be acquired more than once.

As mentioned above in the particular application to rail network monitoring the intended path of the targets, i.e. the trains, may be known and/or the state of the signals controlling movement of traffic on the network may be known. The techniques of target tracking may therefore be used to confirm that the targets are moving in accordance with the signalling. This may be a requirement for some types of tracking systems, for instance a requirement for a Safety Integration Level 4 system (SIL-4) may be that the target passes between sensors as predicted. The tracking control and signalling control may therefore be in communication with one another to ensure that movement of traffic is as predicted and that the sensors are functioning correctly.

In some embodiments in order to optimize overall system performance, it is desirable to use as the input to the tracker, a target detector that is designed to maximize the SNR for the particular target.

It has been appreciated that in certain circumstances, a target may generate a relatively consistent and distinctive signal in the DAS data. For instance consider a vehicle moving along a transport network that is being detected by a DAS sensor with a sensing fibre buried in the ground to run generally along the path of part of the transport network. The acoustic signals generated by the vehicle as it moves along the track may be reasonably consistent. The coupling of these signals to the DAS sensor may also be reasonably consistent. Given the DAS sensor runs continuously alongside the transport network it is possible to develop a reasonable amount of consistent data about movement of the target—which would be difficult to obtain with other types of sensor.

It has been appreciated that in such an instance it may be possible to generate a matched filter for the particular target. A matched filter is the linear signal processing technique that effectively discriminates for a particular characteristic signal and thus provides a good signal-to-noise ratio (SNR) for the signal of interest.

It has been found that this technique is highly applicable to tracking movement of rail vehicles on a rail network as the smoothness of the rails means that the DAS signal is dominated by wheel spacing and load distribution which remain consistent during the vehicle motion. By contrast movement of a vehicle such as truck over a relatively rough surface, e.g. an unpaved road or the like, may result in a generally inconsistent DAS signal due to the surface roughness and potholes etc.

In some embodiments therefore an individual tracker may be configured to derive a matched filter for an identified target or at least determine whether a matched filter can be derived that improves SNR. A template for the matched filter may be derived from several channels of DAS data over a period of time, which in some instances may be relatively short, for example over the first few seconds following target acquisition with a generalized detector (i.e. before a matched filter is applied). Once the matched filter is in operation it will provide significant improvement in SNR for the particular target. This will also improve the accuracy of the reported target position & velocity and may provide a certain degree of immunity to extraneous signals that would otherwise dilute tracking performance. The use of matched filter may also provide the ability to continue accurate tracking below the signal level necessary to acquire reliably with a generalized detector.

In use while tracking a target, the matched filter template may be automatically scaled for velocity to ensure matching is maintained. In some embodiments in use while tracking a target, the matched filter template may be adapted using adaptive filter techniques to ensure optimum performance is maintained if the environment varies. For instance in the application to tracking rail vehicles a change in ballast density of the ballast for the rail track or variations in distance between the sensing fibre and the rail track may result in the optimal matched filter slowly changing over time. The adaptive techniques thus maintain good performance with the associated benefits described above.

In some circumstances it may be beneficial to derive and use more than one matched filter template for each tracked target. For example, when tracking a long train, which could be several hundred meters or even kilometers in length, it may be advantageous to maintain matched filters for relatively short (say 100 m) sections at each end of the train. In other words there may be one matched filter for the front of the train and one for the rear of the train. Two separate filters will likely deliver better performance in providing a location of the front and rear of the train, which may be of high importance if the DAS sensor network is part of an automatic train control system. A single matched filter applied to the whole train in this circumstance may lose coherence as the couplings between cars of the train are relatively compliant and thus parts of the train may undergo accumulated length changes affecting the accuracy of the filter. A tracker with two separate matched filters tuned for the front and rear of the train respectively would be able to track the positions of the front and rear of the train with high accuracy, which could be used for train position reporting and lost car detection.

The nature of the DAS sensor network facilitates the ability to derive and use matched filters in this way, especially in tracking rail vehicles, and the use of matched filters with DAS sensor data to track rail vehicles is a novel aspect of the present disclosure. As with the tracking discussed earlier however the use of matched filters requires a certain amount of historical data to operate correctly which would be lost when the target transitions from an incumbent tracker to a successor tracker.

In some embodiments therefore the Target Descriptor which may be passed from the incumbent tracker to a successor tracker may include a matched filter template for the particular target. Passing the matched filter template associated with a target between trackers as the relevant target transition between areas monitored by the respective tracker helps to maintain optimal tracking performance as targets move about the DAS sensor network. The measurement data from DAS sensors is generally very consistent from one sensor to another and thus the matched filter template may be used directly by the successor tracker on the data available to it. The availability of the matched filter to successor tracker will significantly improve the ability of the successor tracker to identify the target which can thus improve the reliability of handover of the target between the two trackers, especially if the border region between the areas monitored by the respective trackers is noisy.

Embodiments of the present invention thus relate to methods and apparatus of tracking target across a DAS network having a plurality of DAS sensors and in particular for tracking targets across tracker zones monitored by different DAS sensors that maintain good tracking performance. Trackers may be implemented at different parts of the sensor network, i.e. at distributed tracker nodes, to avoid the transfer of large amounts of measurement data around the network. Embodiments relate to the handover of targets between different tracker nodes.

Figure 3:
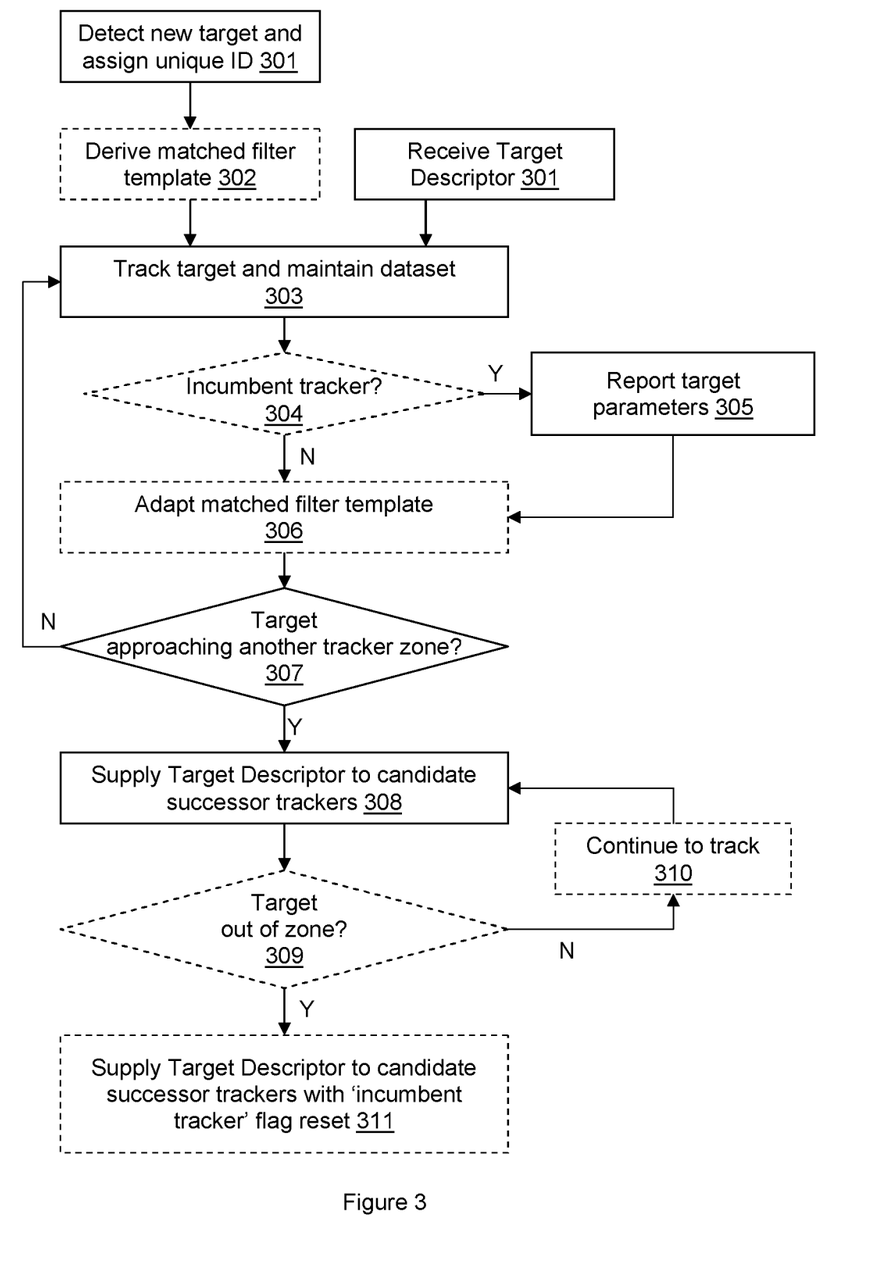
FIG. 3 illustrates a flow chart of a method according to an embodiment of the invention.

FIG. 3 illustrates a flow chart of one example of a method.

At step 301 a new target may be identified by a tracker running on a processing unit of a tracker node of the DAS network. A new target is one that is new to the DAS network, at least within a certain time scale and thus a new target is not one that is handed over from another tracker node. A new target may be a target that enters into the area monitored by the DAS network from outside the monitored area. A new target may also be a target that becomes active within the area monitored by the DAS network. For example when monitoring a rail network a target may be identified as an active train. At some times a train may be inactive, for instance overnight a train may effectively be parked in a known location. The location of the train may be known to a rail network controller, especially if is parked on a controlled part of the rail network, but it may not be classed as an active target and if stationary and unpowered it will not be generating any acoustic signals to be detected by the DAS network. When the train is started up and starts moving it may be detected by a DAS sensor and thus classified as a new active target. It should be noted however that an active train may stop from time to time, e.g. at a station or at some control signal, but remain classified as an active target.

If a target which is new to the DAS network is detected it will therefore be assigned a unique ID. This may be procedurally generated by the tracker node that detects the new target in such a way so that each target ID will be unique or the tracker node may simply assign a code from a predefined list, where each tracker node has a list of unique entries. Alternatively on any new target detection the relevant tracker node could signal detection to some control node which assigns the unique ID.

In some embodiments following acquisition of a target a matched filter template may be derived 302. A certain amount of data following the acquisition of the target may be collected and used to derive the match filter template. One skilled in the art would understand how a matched filter template may be derived from historic data.

Following any new target detection the tracker node will track 303 the target and also maintain a tracking dataset for the tracker. As described previously the tracking dataset will depend on the particular implementation of the tracking algorithm used but contains information useful to the tracking algorithm such as position, velocity, acceleration etc.

In some embodiments the tracker node may determine, at step 304, whether it is an incumbent tracker for that target, i.e. a tracker of the DAS network responsible for tracking and reporting on that target. If so the tracker node will report target parameters in step 305. The reporting of target parameters may comprise reporting the present position and ID of the target possibly along with parameters such as heading, velocity, acceleration etc. and/or supplying data to some suitable visual display. The target parameters may be reported to some DAS network controller, e.g. some control node and/or transmitted to one or more other predetermined entities depending on the application. For instance in the application of rail monitoring the target parameters may be provided to one or more rail network control stations for use in monitoring and/or control of the rail network.

For a totally new target detection that is detected by a single tracker node, that tracker node will be the incumbent tracker. In some embodiments any tracker node that tracks a target may be an incumbent tracker as soon as it is able to track a target and thus there may, at some times, be multiple incumbent trackers for a single target. If there are multiple tracker node each being an incumbent tracker for a given target then a control node may receive target parameters relevant for that target from each of the tracker nodes. As the target parameters may include the target ID the central control will however be able to determine that the received target parameters relate to the same target and process the data accordingly, e.g. by selecting one set or combining the data.

In some embodiments however the DAS network may be arranged such that a tracker node able to track a target may not be the incumbent tracker for that target. In which case the non-incumbent tracker may track the target but may not report the target parameters.

In some embodiments, where a matched filter template is used, the template may be adapted 306 in use as the target is tracked across the network.

At step 307 it is determined whether the target being tracked is approaching another tracker zone, i.e. part of the area being monitored by the DAS network where the signals from the target may be detected by another tracker of the DAS network. In DAS networks where there is a limited degree of overlap between the coverage of the individual DAS sensors the target may tend to approach another tracker zone as it approaches the boundary of the tracker zone appropriate for the incumbent tracker or, in applications such as train monitoring where the movement of the target is relatively constrained, a possible branch point where one of the possible branches is associated with another tracker node. In some DAS sensor networks however there may be parts of the network with a reasonable degree of overlap of tracker zones in which case the target may simply be approaching such an area of overlap.

If the target is not approaching another tracker zone the incumbent tracker may simply continue to track the target, update the tracking dataset and report target parameters as noted above. However if the target is approaching another tracker zone then at step 308 a Target Descriptor for that target is supplied to the candidate successor tracker nodes.

As discussed previously the Target Descriptor will include the target ID and at least some of the tracking dataset relevant for the target. The Target Descriptor may also include the matched filter template if available.

Steps 307 and/or 308 may be performed by an individual tracker of the DAS sensor network, or at least the processing unit implementing the tracker. However in some embodiments a DAS network control node may receive the target data and determine whether it is approaching another tracker zone. If so the DAS network control node may forward a Target Descriptor received from the incumbent tracker to the candidate successor tracker nodes or may instruct the incumbent tracker to send the Target Descriptor to identified candidate successor tracker nodes.

In some embodiments, especially where more than one tracker node may be an incumbent tracker, the original incumbent tracker may continue to track the target until it is lost from that tracker's input data stream. The target will also be acquired and tracked by a new incumbent tracker in the relevant tracker zone. The Target Descriptor will be used by the new tracker to aid in acquisition and tracking of the target. In at least some embodiments however it may be determined at step 309 whether the target meets an out of zone condition for that tracker node. The out of zone condition may be that the target has disappeared from the input data for the relevant tracker or may be that the target has reached a predetermined area where it still could be tracked by the original incumbent tracker but better tracking performance may be achieved by the successor tracker. If the target does not meet the out of zone condition the incumbent tracker may continue to track 310 and may, in some embodiments, supply an updated Target Descriptor to the successor tracker(s).

Once the out of zone condition is reached a final Target Descriptor may be supplied to the successor tracker node that includes an incumbent tracker flag reset to indicate that the successor tracker node is now the incumbent tracker.

It should be noted that the above-mentioned embodiments illustrate rather than limit the invention, and that those skilled in the art will be able to design many alternative embodiments without departing from the scope of the appended claims. Features from various embodiments may be combined and used together except where expressly indicated otherwise. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of tracking targets in a fibre optic distributed acoustic sensing (DAS) network comprising:
tracking targets at each of a plurality of tracker nodes of the DAS network, wherein each tracker node:
receives measurement signals from one or more DAS sensors;
applies a tracking algorithm to said measurement signals to track any targets in a tracker zone corresponding to an area monitored by said one or more DAS sensors; and
maintains, for each target, a tracking dataset of target properties for tracking that target;
the method further comprising:
identifying when a first target in a first tracker zone of a first tracker node is approaching a second tracker zone of a second tracker node and supplying from the first tracker node to the second tracker node a Target Descriptor for the first target wherein the Target Descriptor comprises at least some of the tracking dataset for the first target; and
using the Target Descriptor at the second tracker node to track any entry of the first target into the second tracker zone.

2. A method as claimed in claim 1 wherein the Target Descriptor comprises an identification for the first target which is unique across the DAS network.

3. A method as claimed in claim 1 wherein the tracking dataset comprises at least one of: current position, velocity, acceleration and rate of change of acceleration.

4. A method as claimed in claim 1 wherein the tracking dataset comprises a state vector and covariance matrix for a Kalman filter.

5. A method as claimed in claim 1 wherein the Target Descriptor for the first target comprises all of the tracking dataset maintained by the first tracker node for the first target.

6. A method as claimed in claim 1 wherein the Target Descriptor for the first target comprises a time stamp indicating the last time that the tracking dataset was updated or validated.

7. A method as claimed in claim 1 wherein the step of identifying when a first target in a first tracker zone of a first tracker node is approaching a second tracker zone of a second tracker node is performed by the first tracker node.

8. A method as claimed in claim 7 wherein each tracker node is aware of at least its neighbouring tracker nodes with tracker zones that border or overlap with its tracker zone.

9. A method as claimed in claim 1 wherein the step of identifying when a first target in a first tracker zone of a first tracker node is approaching a second tracker zone of a second tracker node is performed by a control network node that receives information about targets being tracked by each of the tracker nodes.

10. A method as claimed in claim 9 wherein when the control network node identifies when a first target in a first tracker zone of a first tracker node is approaching a second tracker zone of a second tracker node it generates a control signal to the first tracker node instructing it to transmit the relevant Target Descriptor.

11. A method as claimed in claim 10 wherein the control signal instructs the first tracker node to send the relevant Target Descriptor to the second tracker node.

12. A method as claimed in claim 10 wherein the control network node receives the relevant Target Descriptor and forwards it to the second tracker node.

13. A method as claimed in claim 1 wherein the Target Descriptor comprises a first field which indicates which tracker node is responsible for the first target.

14. A method as claimed in claim 13 wherein the first tracker node provides at least one Target Descriptor to the second tracker node with the first field set to indicate that the first tracker node is responsible for the first target and subsequently provides an updated Target Descriptor to the second tracker node with the first field set to indicate that the first tracker node is no longer responsible for the first target.

15. A method as claimed in claim 1 wherein each tracker node is configured to, for at least some targets being tracked, maintain at least one matched filter template for said target and to track said target using said at least one matched filter.

16. A method as claimed in claim 15 wherein said Target Descriptor comprises at least one matched filter template maintained by the first tracker node for the first target and wherein the second tracker node uses the at least one matched filter template from the Target Descriptor to acquire and track the first target in the second tracker zone.

17. A method as claimed in claim 1 wherein the DAS network is configured to track movement of traffic on a transport network.

18. A method as claimed in claim 17 wherein the transport network is a rail network.

19. A tracker node for a fibre optic distributed acoustic sensing (DAS) sensor network comprising:
   a processor configured to, in use:
      receive measurement signals from one or more DAS sensors; and
      apply a tracking algorithm to said measurement signals to track any targets in a first tracker zone corresponding to an area monitored by said one or more DAS sensors;
      wherein the tracking algorithm is configured to maintain, for any such target, a tracking dataset of target properties for tracking that target;
   wherein the processor is configured to receive a Target Descriptor for a first target, wherein Target Descriptor for the first target corresponds to data about a target in a second tracker zone of another tracker node of the DAS sensor network that is approaching the first tracker zone, and
   the processor is configured to use said Target Descriptor to track any entry of the first target into the first tracker zone.

20. A control node for a fibre optic distributed acoustic sensing (DAS) sensor network comprising:
   a controller configured to receive target parameters from a plurality of tracker nodes, each tracker node comprising one or more DAS sensors and a processor configured to apply a tracking algorithm to track any targets in a first tracker zone corresponding to an area monitored by said one or more DAS sensors;
   wherein the controller is configured to determine when a first target in a first tracker zone is approaching a second tracker zone and to control transfer of a Target Descriptor from the tracker node associated with the first tracker zone to the tracker node associated with the second tracker zone, wherein the Target Descriptor comprises at least part of a tracking dataset of target properties for tracking the first target.

* * * * *